March 12, 1935.  H. D. MOSHER  1,994,432
RULE FORM
Filed Oct. 11, 1934
Fig.1
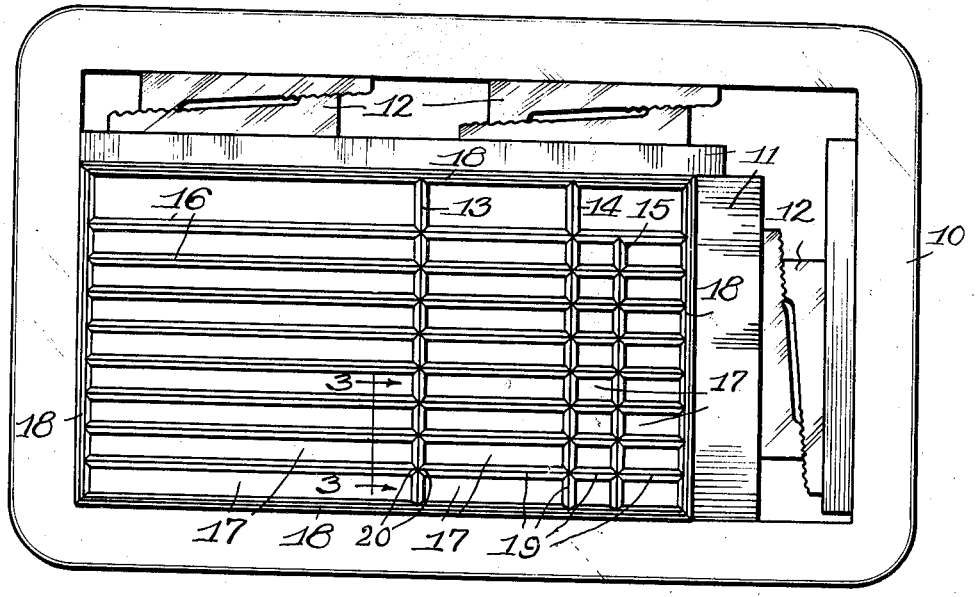
Fig.2
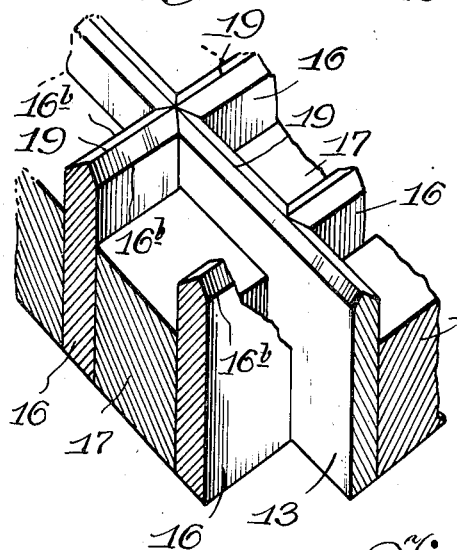
Fig.3
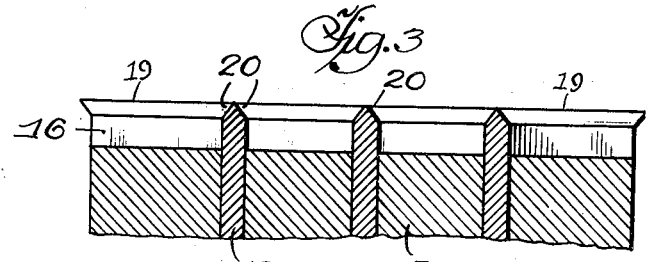
Fig.4
Fig.5
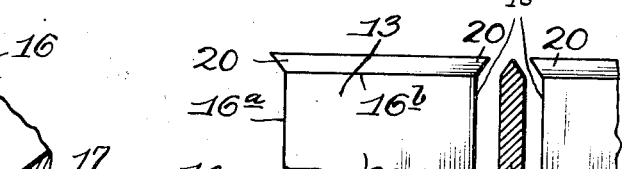
Witness:
Chas. E. Hursh.
Inventor,
Howard D. Mosher,
By Maxwell F. Cargill  Atty.

Patented Mar. 12, 1935

1,994,432

UNITED STATES PATENT OFFICE 1,994,432

RULE FORM

Howard D. Mosher, Chicago, Ill., assignor of one-half to Alex A. Anderskow, Chicago, Ill.

Application October 11, 1934, Serial No. 747,813

2 Claims. (Cl. 101—400)

This invention relates to improvements in rule forms.

One object of the invention is to provide a rule form which will print connecting or intersecting lines, the individual rules of the form being held in the desired relation by spacing slugs which support the individual rules throughout the length thereof against flexing when clamped in a chase.

An advantage of the present improvements resides in the fact that the rules may be cut from strips of rule material without slotting or grooving the side walls thereof for the reception of the ends of abutting rules and hence the parts of the form set-up are economical to produce and their conjoint cooperation facilitates their assembly.

It has heretofore been proposed to provide rule forms which will print intersecting or connecting lines but such proposals of which I am aware have contemplated the provision of numerous slots and grooves in either or both the vertical or horizontal rules for receiving portions of the abutting or intersecting rules for effecting the interlocking of the rules in the desired spaced relation.

By the present improvements slots and grooves in the rules are eliminated and plane-walled rules, cut the desired length from rule stock and held in the desired spaced relation by spacing slugs, are employed, thus providing a more economical arrangement and the parts of which can be set up more readily in the composing room.

In the accompanying drawing, which illustrates an embodiment of the invention,

Figure 1 is a top plan view of a conventional chase and furniture showing an improved rule form held in position thereby, Figure 2 is an enlarged broken perspective view illustrating the vertical rule and two lines of horizontal rules held in spaced relation by spacing slugs.

Figure 3 is an enlarged broken sectional view taken on line 3—3 of Figure 1.

Figure 4 illustrates a vertical rule in section and two horizontal rules in detached relation.

Figure 5 is a broken perspective view of one end of a rule illustrating a projection at the end of the rule by means of which a printed line is caused to join a line of an abutted rule.

In the drawing 10 indicates a conventional printer's chase having furniture 11 disposed therein which, by means of quoins 12 clamp the rule form in printing position. The chase, furniture and quoins are conventional and form no part of the present improvements.

The rule form illustrated in Fig. 1 is shown as comprising three vertical rules 13, 14 and 15, and a number of horizontal sectional rules 16. Any desired number of vertical and horizontal rules may be employed in setting up the desired form. The rules are held in spaced relation by rectangular slugs 17 which also vary in shape and size as the make-up of the form requires.

The form shown in Fig. 1 has margin rules 18 to print a double margin around the entire form but this feature is optional and is not essential to the present improvements.

In composing a form from the rules and slug mentioned, it is preferred that the rules 13 which print the vertical lines be continuous while the rules 16 which print the horizontal lines abut the sides of the rules 13, although the reverse arrangement may be employed if desired in setting up any particular form.

As will be noted, the rules have their upper edges beveled to provide the line printing edges 19. At the points of the form where the vertical and horizontal lines are to intersect or join, the corresponding horizontal rules 16 abut the side wall or walls of the vertical rules 13. The abutting end walls 16a of the rules 16 are vertical from the base thereof to the horizontal plane of the arrises 16b to enable said walls to seat uniformly against the side walls of the rules 13. From the plane of the lines or arrises 16b, however, the vertical end walls 16a flare outwardly as at 16c at an angle preferably corresponding to the bevel of the upper edges of the rule, thereby forming projections 20 which carry the printing edge 19 of the horizontal rules into such close proximity to the printing edge of the vertical rules that the printed lines of the respective rules will join or intersect.

By forming the lower surfaces 16c of the extension 20 at an angle corresponding to the angle of the bevel of the abutted rule, the extensions are adequately supported against bending or deflection from the plane of the printing surface and sharp intersections or junctions of the horizontal and vertical lines is assured.

The slugs 17 which space the various rules are of less height than the rules and preferably are cut from conventional printing slug material. The slugs provide firm support for the rules and retain them in their proper position when clamped in the chase 10 as will be seen.

By providing the abutted rules with plane side walls, that is, walls without slots or grooves and having the end walls of the abutting rules arranged merely to contact with such plane walls of the abutted rules and supporting the rules in spaced relation by rectangular slugs which can be cut on conventional composing room saws, a substantial saving in time and labor is effected in composing a rule form.

The use of the supporting slugs is of advantage in that the various rules are supported throughout their length against flexing movement when clamped in the chase and thus straight lines in the printed forms are assured.

While one embodiment of the invention has been shown and described for the purpose of illustration, certain modifications thereof may be made within the scope of the invention as defined by the appended claims.

I claim:

1. A rule form comprising abutting and abutted rules having plane ends and side walls and beveled upper portions providing line printing edges, the ends of said abutting rules having projections at the beveled portions thereof for extending the printing edges of the same into juncture with the printing edge of the abutted rules, said projections having lower surfaces disposed at angles corresponding to the angles of the contiguous beveled surface of the abutted rule and adapted to contact therewith to support said projections throughout the length thereof, and means disposed between adjacent rules for holding the same in spaced relation.

2. A rule form comprising abutting and abutted rules having plane ends and side walls and beveled upper portions providing line printing edges, the ends of said abutting rules having projections at the beveled portions thereof for extending the printing edges of the same into juncture with the printing edge of the abutted rules, said projections having lower surfaces disposed at angles corresponding to the angles of the contiguous beveled surface of the abutted rule and adapted to contact therewith to support said projections throughout the length thereof, and individual spacing slugs disposed between adjacent rules and contacting with the side walls thereof for supporting the same against displacement and flexing action when clamped in a chase.

HOWARD D. MOSHER.